No. 790,130. PATENTED MAY 16, 1905.
T. W. HOGG.
DREDGER OR LIKE HOPPER.
APPLICATION FILED NOV. 23, 1904.
2 SHEETS—SHEET 1.
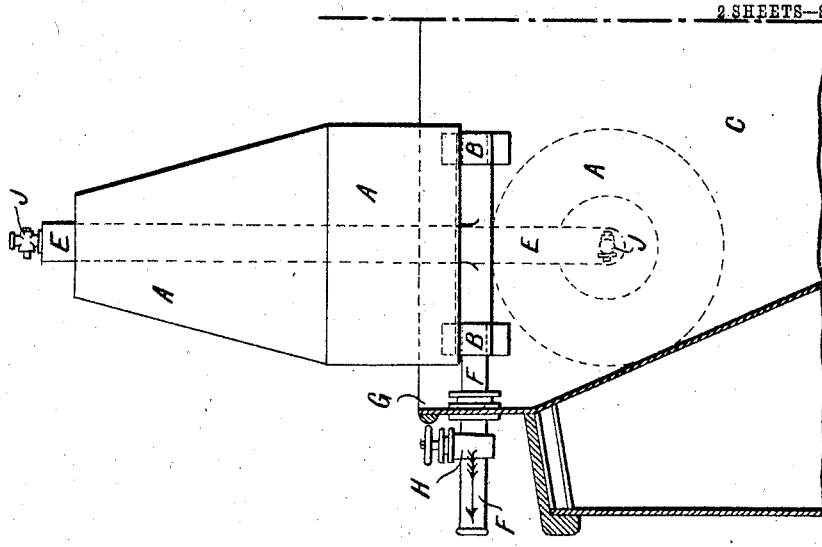
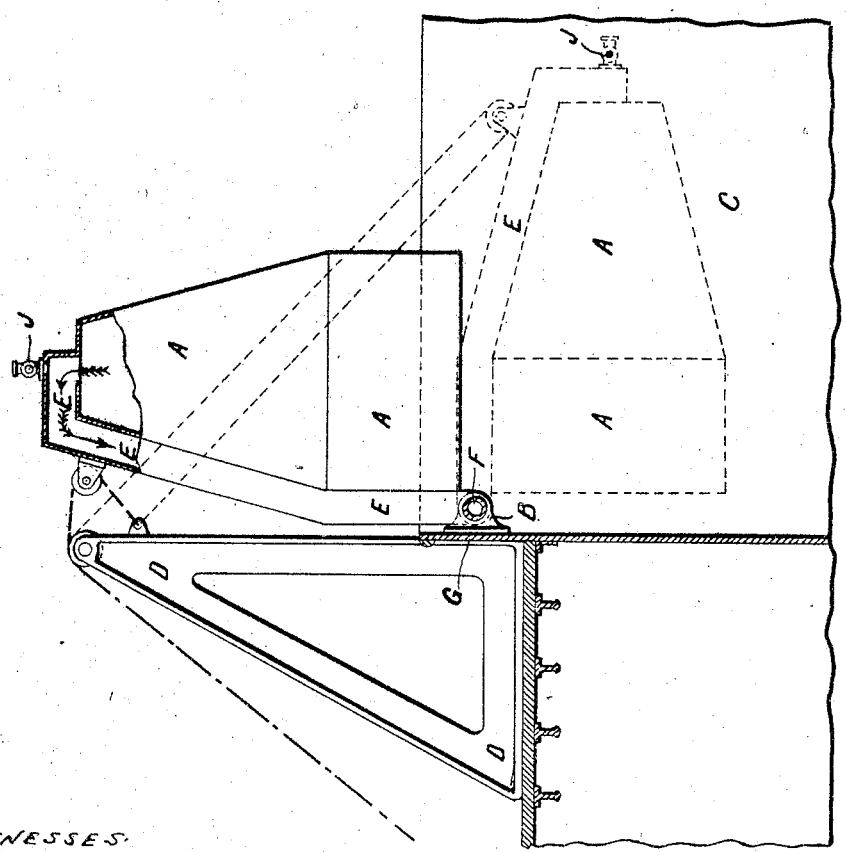
WITNESSES:
F. W. Wright
M. A. Woodruff
INVENTOR
Thomas Willcox Hogg
BY
Howson and Howson
HIS ATTORNEYS No. 790,130. PATENTED MAY 16, 1905.
T. W. HOGG.
DREDGER OR LIKE HOPPER.
APPLICATION FILED NOV. 23, 1904.
2 SHEETS—SHEET 2.
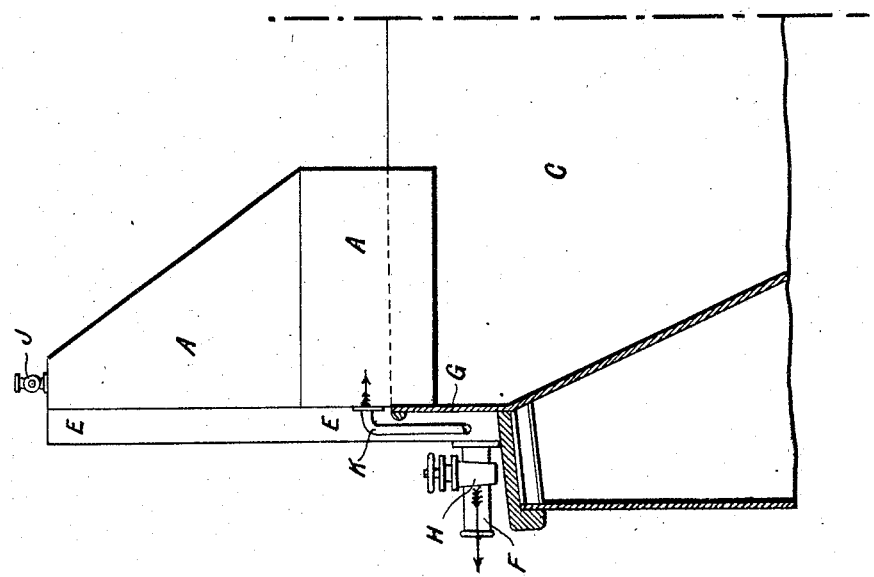
WITNESSES:
J. W. Wright
M. H. Woodruff
INVENTOR
Thomas Willey Hogg
BY
Howson and Howson
HIS ATTORNEYS.

No. 790,130. Patented May 16, 1905.

UNITED STATES PATENT OFFICE.

THOMAS W. HOGG, OF PAISLEY, SCOTLAND.

DREDGER OR LIKE HOPPER.

SPECIFICATION forming part of Letters Patent No. 790,130, dated May 16, 1905.

Application filed November 23, 1904. Serial No. 234,015.

*To all whom it may concern:*

Be it known that I, THOMAS WILLOCK HOGG, a subject of the King of Great Britain and Ireland, and a resident of Paisley, in the county of Renfrew, Scotland, (whose postal address is 10 Townhead Terrace, Paisley, county of Renfrew, Scotland,) have invented certain new and useful Improvements in or Connected with Dredger or Like Hoppers, (for which I have applied for a British Patent No. 22,585, dated October 20, 1904,) of which the following is a specification.

My invention has for its object to provide an improved apparatus for controlling the overflow from hoppers, when they are being loaded from dredgers in such a manner that the finer particles of the material dredged and discharged into the hoppers are more effectively separated from the effluent before its final discharge or overflow than has heretofore been possible, so increasing the speed at which the hoppers may be loaded and augmenting their output, apparatus made according to my invention being applicable to hoppers in sand pump or other dredgers, in barges, or on land.

In carrying out my invention I employ a vessel one end of which is open and the other end of which is connected by a pipe or passage of comparatively small area with a discharge-outlet slightly below the level of the contents of the hopper. In operation this vessel is first immersed in the liquid discharged into the hopper and is then raised above the level thereof, but only to such a height that its lower and open end still remains below the level of the liquid in the hopper. By this action there is raised within the vessel and supported there by atmospheric pressure a comparatively large body of the liquid in the hopper, or the vessel may be a permanent structure and a portion of the liquid in the hopper be raised into it in any convenient manner. The upper part of this column is continuously discharged at a slow rate by siphonic action through the outlet-pipe of comparatively small area at the top of the vessel and the lighter material (usually discharged along with the effluent) has time to fall during the slow and quiescent upward movement of the column, thus becoming effectually separated from the effluent before the latter is discharged through the outlet-pipe, the discharge-outlet of which is placed at a level so slightly below that of the contents of the hopper as to give a slow and undisturbed flow.

In order that my invention and the manner of performing the same may be properly understood, I hereunto append two sheets of explanatory drawings, throughout which like reference-letters indicate similar parts, and in which—

Figures 1 and 2, Sheet 1, are respectively diagrammatic side and end elevations of one example of apparatus made according to my invention, while Fig. 3, Sheet 2, is a diagrammatic end elevation of a second example.

An apparatus made according to the example shown in Figs. 1 and 2 of the accompanying drawings consists of an open-ended conoido-cylindrical vessel A, carried at its lower end upon hinges B in such a manner that it may be turned from its horizontal position (in which it is shown in dotted lines in Figs. 1 and 2 and in which position it is until the hopper C has initially become full) to a vertical position (in which it is shown in full lines in Figs. 1 and 2) and to which it is turned upon the hopper becoming full by means of tackle carried by the bracket D, (or any other convenient arrangement might be employed for operating the vessel.) What is the upper end of this vessel A when it is in its vertical position is connected by a passage E with a discharge-pipe F, the outlet of which is slightly below the level of the contents of the hopper—that is, of the hopper-coaming G. The discharge-pipe F forms the trunnion of the hinges B, upon which the vessel A turns, and may have upon it a valve H for regulating the rate of outflow of the clear effluent from the top of the vessel A. An air-valve J may also be provided to discharge the contents of the vessel into the hopper when loading is completed, air admitted by the valve J to the vessel causing its contents to slowly subside into the hopper.

According to the example shown in Fig. 3 the vessel A is fixed in a vertical position and is filled (after the hopper C has become filled) by filling it with steam by the steam connection K, the vacuum formed by the condensation of this steam after the supply is cut off causing the material in the hopper to fill the vessel under the influence of atmospheric pressure, or a vacuum may be produced in the vessel by any other convenient means—such, for example, as an ejector or vacuum-pump. A passage E and discharge-pipe F, as in the former example, and a valve H for controlling the rate of outflow of the effluent and admitting of a vacuum being formed within the vessel are provided, while an air-valve J may also be provided.

It is obvious that the details of the carrying out of my invention may be widely departed from without departing from its essence, which is the provision of a vessel capable of supporting by atmospheric pressure a column of liquid within it above the level of the contents of the hopper and provided with connections at its upper end to a discharge-outlet below the level of the liquid in the hopper through which the liquid in the vessel may be discharged by siphonic action, and that vessel may be of any convenient form (for example, it might be a comparatively long structure and have several outlets and might be subdivided internally into a number of compartments) and be supported and moved (if it be movable) and its discharge connections be arranged in any convenient manner. For example, the vessel might be lowered and raised vertically and any convenient number of vessels may be applied to each hopper.

What I claim as my invention is—

1. An effluent-discharge apparatus for a hopper; comprising a vessel capable of supporting a body of the liquid in the hopper above its level therein by atmospheric pressure, a discharge-outlet therefrom below the level of the liquid in the hopper, a connection between the discharge-outlet and the upper part of the vessel and means for filling the vessel, as described.

2. An effluent-discharge apparatus for a hopper; comprising a vessel capable of supporting a body of the liquid in the hopper above its level therein by atmospheric pressure, a discharge-outlet therefrom below the level of the liquid in the hopper, a connection between the discharge-outlet and the upper part of the vessel, a valve controlling said outlet, and means for filling the vessel, as described.

3. An effluent-discharge apparatus for a hopper; comprising a vessel capable of supporting a body of the liquid in the hopper above its level therein by atmospheric pressure, a discharge-outlet therefrom below the level of the liquid in the hopper, a connection between the discharge-outlet and the upper part of the vessel, a valve controlling said outlet, means for filling the vessel and a valve controlling the admission of air to the vessel, as described.

4. An effluent-discharge apparatus for a hopper; comprising a vessel capable of supporting a body of the liquid in the hopper above its level therein by atmospheric pressure, a discharge-outlet therefrom below the level of the liquid in the hopper, a connection between the discharge-outlet and the upper part of the vessel and means for turning the vessel from a vertical to a horizontal position, to fill it, as described.

5. An effluent-discharge apparatus for a hopper; comprising a vessel capable of supporting a body of the liquid in the hopper above its level therein by atmospheric pressure, a discharge-outlet therefrom below the level of the liquid in the hopper a connection between the discharge-outlet and the upper part of the vessel, a valve controlling said outlet, means for turning the vessel from a vertical to a horizontal position, to fill it, and a valve controlling the admission of air to the vessel, as described.

In testimony whereof I have signed my name to this specification in the presence of two subscribing witnesses.

THOS. W. HOGG.

Witnesses:
  DAVID FERGUSON,
  WILFRED HUNT.